United States Patent [19]

Schmidtmann

[11] 4,388,650
[45] Jun. 14, 1983

[54] TELEVISION RECEIVER AUDIO CHANNEL OPERATING ACCORDING TO THE INTERCARRIER SYSTEM

[75] Inventor: Burchard Schmidtmann, Barsinghausen, Fed. Rep. of Germany

[73] Assignee: Licentia Patent-Verwaltungs-GmbH, Frankfurt am Main, Fed. Rep. of Germany

[21] Appl. No.: 261,808

[22] Filed: May 8, 1981

[30] Foreign Application Priority Data

May 9, 1980 [DE] Fed. Rep. of Germany ....... 3017760

[51] Int. Cl.³ ............................................. H04N 5/62
[52] U.S. Cl. ................................................. 358/197
[58] Field of Search ................................. 358/197, 188

[56] References Cited

U.S. PATENT DOCUMENTS

| 2,505,843 | 5/1950 | Smith . | |
|---|---|---|---|
| 3,061,674 | 10/1962 | Janssen et al. . | |
| 3,961,135 | 6/1976 | Ohyama et al. | 358/188 |
| 4,258,391 | 3/1981 | Papay | 358/197 |

FOREIGN PATENT DOCUMENTS 192974 11/1957 Austria .
1079124 4/1960 Fed. Rep. of Germany .
1089661 9/1958 France .

OTHER PUBLICATIONS

M. Rehak et al., Quasi–Paralleltonkanal für störungsfreien Fernsehton, Grundig Technische Informationen 3/79, pp. 106–109.

Primary Examiner—Richard Murray
Attorney, Agent, or Firm—Spencer & Kaye

[57] ABSTRACT

In a television receiver for receiving a signal including an audio IF carrier and a video IF carrier modulated with picture information, the receiver having an audio channel operating according to the intercarrier principle and including a mixing device connected for combining the carriers for generating an intercarrier frequency signal by mixing the audio IF carrier with a mixed carrier constituted by the video IF carrier from which picture information modulation has been removed, there is provided a switch device connected for supplying the video IF carrier to the mixing device only during periods when the video IF carrier is free of picture information modulation.

4 Claims, 2 Drawing Figures

TELEVISION RECEIVER AUDIO CHANNEL OPERATING ACCORDING TO THE INTERCARRIER SYSTEM

BACKGROUND OF THE INVENTION

It is known to conduct the video IF carrier and the audio IF carrier of a television receiver via a common IF amplifier in which the gain for the audio carrier is reduced compared to that for the video carrier. At the output of the video rectifier, which operates as an amplitude demodulator, there then appears, inter alia, the difference frequency of 5.5 MHz between the video IF carrier and the audio IF carrier which is fed to the FM audio demodulator via a further amplifier. In this intercarrier circuit, the audio reproduction is relatively sensitive to interference by the video signal.

In parallel sound television receivers, the video IF carrier and the audio IF carrier are transmitted via separate amplification paths to separate demodulators so that they cannot influence one another and mutual interference between video and audio can no longer occur. However, such a circuit entails additional expenditures.

It is also know, as disclosed in German Pat. No. 1,138,813, to selectively couple the audio IF carrier and the video IF carrier out of the IF amplifier, to free the video IF carrier from the modulation by the video signal and then to obtain an inter carrier of 5.5 MHz by mixing the two carriers. The elimination of the modulation which represents the picture content is then essentially effected by amplitude limitation of the video IF carrier. However, in this circuit there still remain phase fluctuations which are dependent on the picture content in the mixed carrier obtained by removing the picture dependent modulation and these phase fluctuations may also lead to interference in the audio reproduction.

It would also be conceivable to generate the mixed carrier in an oscillator which oscillates freely at precisely the video IF and then to mix it with the modulated audio IF carrier to obtain the intercarrier. Then the mixed carrier would be free of any amplitude or phase modulation. But this solution cannot be realized in practice for the following reason:

Microphony phenomena and electrical stray currents from the mains or the vertical deflection member cause slight changes in frequency in the oscillator of an order of magnitude of several hundred hertz so that the frequencies of the video IF carrier and of the audio IF carrier change in the same way. Since the difference carrier, or intercarrier, is obtained by mixing these two carriers, these changes in frequency have practically no effect in the resulting intercarrier. However, if the audio IF carrier is subjected to these frequency fluctuations but the mixed carrier is not, the resulting audio will again be subject to interference from changes in the oscillator frequency.

SUMMARY OF THE INVENTION

It is an object of the present invention to generate a mixed carrier which, although it follows the frequency changes in the oscillator in the mixer stage in the desired manner, is not dependent in amplitude and phase on the picture content.

The above and other objects are achieved, according to the invention, in a television receiver for receiving a signal including an audio IF carrier and a video IF carrier modulated with picture information, the receiver having an audio channel operating according to the intercarrier principal and including mixing means connected for combining the carriers for generating an intercarrier frequency signal by mixing the audio IF carrier with a mixed carrier constituted by the video IF carrier from which picture information modulation has been removed, by the provision of switch means connected for supplying the video IF carrier to the mixing means only during periods when the video IF carrier is free of picture information modulation.

Thus, according to the present invention, the modulated video IF carrier is utilized to obtain the mixed carrier only if it is not modulated by the picture content but has a constant amplitude based on the video signal. The time constants of the circuit can be dimensioned in such a manner that, on the one hand, the mixed carrier remains synchronized even during the horizontal sweep period by the oscillations gated during the horizontal blanking period and, on the other hand, the frequency of the mixed carrier is still able to follow, in the desired manner, the frequency fluctuations of the video IF carrier so as to avoid the above-mentioned interference. This substantially improves the audio signal-to-noise ratio.

The present invention will be described with the aid of the drawings which depict an embodiment of a television receiver constructed to operate according to the CCIR standard.

DESCRIPTION OF THE PREFERRED EMBODIMENTS

Figure 1:
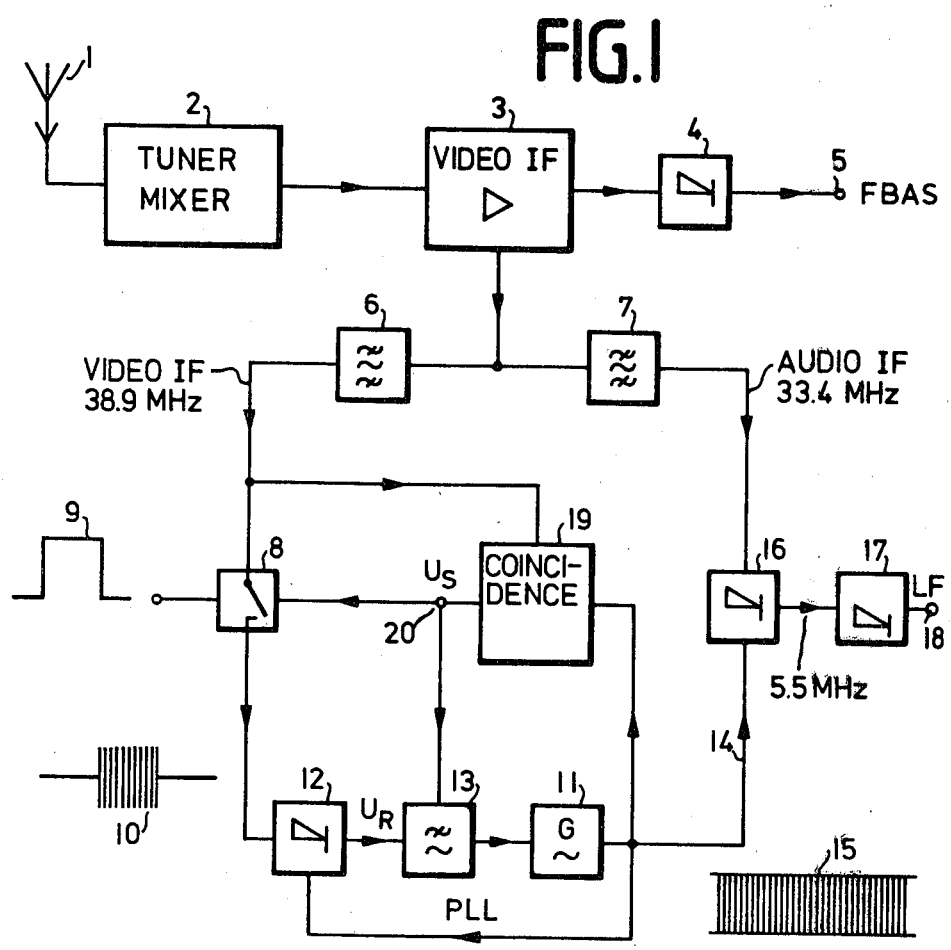
FIG. 1 is a block circuit diagram of a preferred embodiment of the present invention.

FIG. 1 depicts a television receiving antenna 1 which feeds on HF input and mixing member 2 that furnishes a video IF carrier and an audio IF carrier to a video IF amplifier 3. This amplifier furnishes, via an amplitude rectifier 4, the FBAS signal at terminal 5 for picture reproduction.

Figure 2:
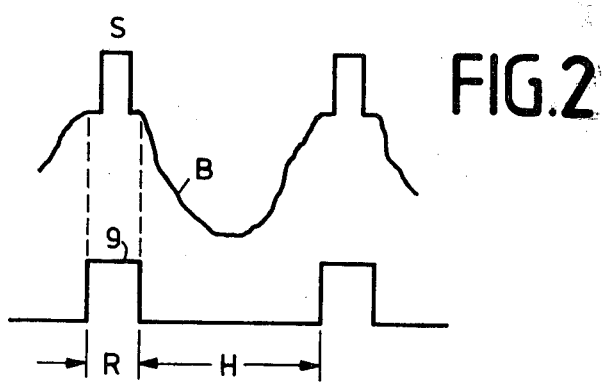
FIG. 2 is a signal diagram illustrating the operation of the circuit of FIG. 1.

Two frequency selective filters 6 and 7 separate from the video IF amplifier 3 the 38.9 MHz video IF carrier and the 33.4 MHz audio IF carrier. The video IF carrier reaches a gate 8 which is enabled by gating pulses 9 only during the entire horizontal blanking, or retrace, period. Thus, the video IF carrier oscillations 10 which appear at the output of gate 8 are not modulated in amplitude and phase by picture information B. The amplitude changes of the oscillations 10 during each horizontal sync pulse S and the adjacent porches, FIG. 2, is not shown for the sake of simplicity.

The oscillations 10 reach a phase control loop (PLL circuit) including a voltage controlled oscillator 11, a phase comparison stage 12 and a voltage controllable lowpass filter member 13. This circuit is dimensioned in such a way that the oscillator 11 is synchronized with the frequency of the oscillations 10 and a continuous mixed carrier 15 with constant amplitude and phase shifts, which are independent of the picture content, appears in line 14. Changes in frequency in the video carrier at the output of the filter 6 due to microphony phenomena and stray mains or vertical deflection currents, however, have an advantageous effect on the frequency of the mixed carrier 15 in line 14. For this purpose, the limit frequency fg of the filter member 13 lies slightly below the horizontal sweep frequency $f_H$ of 15,625 Hz.

The audio carrier from filter 7, which is frequency modulated with the audio signal and affected by microphony phenomena and other above-mentioned influences, and the mixed carrier 15 are mixed in a mixer stage 16. The result is the difference carrier of 5.5 MH$_z$ which is frequency modulated with the audio signal. From this difference carrier, an FM demodulator 17 obtains the LF audio signal at terminal 18 which it feeds to further LF amplifiers and then to the loudspeaker.

In order for oscillator 11 to reach its synchronized state, i.e. coincidence of the frequency of the oscillations 10 and 15, as quickly as possible, there is provided a coincidence, or frequency difference, stage 19. It receives the 38.9 MHz audio IF carrier and the mixed carrier 15. If the frequencies of these two voltages do not coincide, i.e. the oscillator 11 is not yet synchronized, a setting voltage value $U_s$ appears at output terminal 20 which has two effects. Firstly, it continuously enables gate 8 so that a continuous, uninterrupted video IF carrier can reach the phase comparison stage 12 and thus it becomes easier to lock in the oscillator 11. Secondly, it considerably reduced the time constant of the filter member 13, i.e. its lower limit frequency is raised, e.g. the filter member 13 conducts substantially completely. Thus, the control voltage $U_R$ fed to the oscillator 11 can change quickly and quickly establish the synchronized state.

These two measures, the uninterrupted feeding of the video IF carrier to the phase comparison stage 12 and the reduction of the effectiveness of the filter member 13, thus assure that the synchronized state of the oscillator 11 is reached quickly. As soon as this state is reached, the setting value $U_s$ disappears so that now, in the desired manner, only the keyed oscillations 10 reach the phase comparison stage 12 and the above-mentioned greater time constant is effective in the path of the control voltage $U_R$.

FIG. 2 shows the gating pulse 9 for gate 8 having a period equal to the duration of the horizontal blanking time R during which the oscillations 10 reach the phase comparison stage 12. During each horizontal sweep period H, the video signal B is isolated from the phase comparison stage 12. Synchronization of the oscillator 11 is then effected by the control voltage $U_R$ which is maintained by means of the filter member 13 and is actually effected only during the blanking times R.

A coincidence stage for detecting synchronism between line sync pulses of a received signal and locally generated line frequency pulses is more fully described in U.S.-Pat. No. 30 61 674. A circuit for detecting synchronism between said pulses and changing the time constant of a filter within the phase-locked-loop of the line deflection circuit is more fully described in German Patent Specification No. 10 79 124. The limit frequency of filter 13 is chosen less than line frequency and may be about 8 kHz in the case of synchronism and is switched by setting signal $U_s$ to a value much higher than line frequency, e.g. to a value of about 1–3 MHz in the case there is no synchronism.

It will be understood that the above description of the present invention is susceptible to various modifications, changes and adaptations, and the same are intended to be comprehended within the meaning and range of equivalents of the appended claims.

What is claimed is:

1. In a television receiver for receiving a signal including an audio IF carrier and a video IF carrier modulated with picture information, the receiver having an audio channel operating according to the intercarrier principle and including means connected to receive the video IF carrier for generating therefrom a mixed carrier constituted by the video IF carrier from which picture information modulation has been removed, and mixing means connected for generating an intercarrier frequency signal by mixing the audio IF carrier with the mixed carrier, the improvement comprising switch means connected for supplying the video IF carrier to said mixed carrier generating means only during the horizontal blanking periods of the television signal when the video IF carrier is free of picture information modulation, and wherein said mixed carrier generating means include a phase control loop connected to said switching means.

2. Receiver as defined in claim 1 wherein said phase control loop comprises a voltage controlled oscillator connected for producing the mixed carrier, and said mixed carrier generating means further comprise a coincidence circuit connected to receive the video IF carrier and the mixed carrier for producing a setting signal when the video IF carrier and the mixed carrier are not in synchronism, said loop being responsive to the existence of the setting signal to accelerate the locking of said oscillator to the video IF carrier.

3. Receiver as defined in claim 2, wherein the output of said coincidence circuit is connected for causing a setting signal to effect continuous delivery of the video IF carrier to said loop.

4. Receiver as defined in claim 2 or 3 wherein said loop further comprises a lowpass filter connected ahead of said oscillator and the output of said coincidence circuit is connected for causing a setting signal to effect reduction of the time constant of said filter.

* * * * *